US008964560B2

(12) United States Patent
Schneider et al.

(10) Patent No.: US 8,964,560 B2
(45) Date of Patent: Feb. 24, 2015

(54) APPARATUS, METHOD, COMPUTER PROGRAM PRODUCT AND SYSTEM FOR REQUESTING ACKNOWLEDGMENT OF TRANSMITTED DATA PACKETS

(75) Inventors: Simon Schneider, Herne (DE); Jan Frey, Münster (DE); Daniel Wernet, Bochum (DE); Timo Ströhlein, Herne (DE)

(73) Assignee: Nokia Solutions and Networks Oy, Espoo (FI)

( * ) Notice: Subject to any disclaimer, the term of this patent is extended or adjusted under 35 U.S.C. 154(b) by 563 days.

(21) Appl. No.: 11/870,515

(22) Filed: Oct. 11, 2007

(65) Prior Publication Data

US 2009/0100170 A1  Apr. 16, 2009

(51) Int. Cl.
*H04L 1/18* (2006.01)
*H04L 1/16* (2006.01)
*H04L 12/801* (2013.01)

(52) U.S. Cl.
CPC ............ *H04L 1/1685* (2013.01); *H04L 1/1874* (2013.01); *H04L 47/12* (2013.01)
USPC ............ 370/236; 370/412; 455/422; 455/466

(58) Field of Classification Search
USPC ........................................................ 709/223
See application file for complete search history.

(56) References Cited

U.S. PATENT DOCUMENTS

| 4,841,526 | A | * | 6/1989 | Wilson et al. | 714/748 |
| 4,970,714 | A | * | 11/1990 | Chen et al. | 370/216 |
| 6,760,307 | B2 | * | 7/2004 | Dunning et al. | 370/231 |
| 6,947,394 | B1 | * | 9/2005 | Johansson et al. | 370/282 |
| 2003/0043744 | A1 | * | 3/2003 | Lu et al. | 370/236 |
| 2003/0137939 | A1 | * | 7/2003 | Dunning et al. | 370/235 |
| 2004/0002943 | A1 | * | 1/2004 | Merrill et al. | 707/1 |
| 2004/0009779 | A1 | * | 1/2004 | Qu et al. | 455/466 |
| 2004/0092289 | A1 | * | 5/2004 | Yamada et al. | 455/560 |
| 2004/0110499 | A1 | * | 6/2004 | Kang et al. | 455/422.1 |
| 2005/0088973 | A1 | * | 4/2005 | Ibezim et al. | 370/235 |

(Continued)

FOREIGN PATENT DOCUMENTS

| CN | 1539215 | 10/2004 |
| CN | 1599997 | 3/2005 |

OTHER PUBLICATIONS

Eugen Borcoci, Aug.-Sep. 1998, Performance evaluation for Estelle specifications II, Reasearch No. 981002-LOR.*

(Continued)

*Primary Examiner* — Hamza Algibhah
*Assistant Examiner* — Natisha Cox
(74) *Attorney, Agent, or Firm* — Squire Patton Boggs (US) LLP (57) ABSTRACT

An apparatus, method, computer program product and system are provided for initiating a request for acknowledgment of successfully, or unsuccessfully, transmitted data packets, wherein the request is initiated in response to the detection of a potential overload situation or an upcoming resource limitation. In particular, a transmitter may monitor certain resources associated with the transmitter, such as memory consumption or processing capacity, and automatically request that a receiver transmit an acknowledgement when a potential overload of one or more of the resources is detected. This may occur, for example, when it is determined that memory consumption has exceeded a predefined threshold or that the processing capacity has been substantially exhausted, to name a few.

17 Claims, 5 Drawing Sheets

(56) References Cited

U.S. PATENT DOCUMENTS

2005/0124369 A1* 6/2005 Attar et al. .................... 455/522
2005/0135394 A1* 6/2005 Sethi et al. .................... 370/412
2006/0253622 A1* 11/2006 Wiemann et al. ............... 710/52
2007/0014274 A1* 1/2007 Choi ............................ 370/349
2008/0186862 A1* 8/2008 Corbett et al. ................ 370/237

OTHER PUBLICATIONS

Eugen Borcoci, Aug.-Sep. 1998, Performance Evaluaion for Estelle specifications II, research No. 9810025-LOR.*

Eugen Borcoci, Performance Evaluation for Estelle Specifications II, Research Report, Aug.-Sep. 1998, pp. 1-46, University of Bucharest.*

International Search Report from PCT/IB2008/002241 dated Feb. 26, 2009.

IEEE Std 802.11-2007 (Revision of IEEE Std 802.Nov. 1999) "IEEE Standard for Information Technology—Telecommunications and information exchange between systems—Local and metropolitan area networks—Specific requirements; Part 11: Wireless LAN Medium Access Control (MAC) and Physical Layer (PHY) Specifications" Approved Mar. 8, 2007, pp. 1-1076.

IEEE Std 802.16/2004 (Revision of IEEE Std 802.16-2001) "IEEE Standard for Local and metropolitan area networks; Part 16: Air Interface for Fixed Broadband Wireless Access Systems" IEEE Computer Society and IEEE Microwave Theory and Techniques Society; Sponsored by the LAN/MAN Standard Committee; Oct. 1, 2004.

* cited by examiner

APPARATUS, METHOD, COMPUTER PROGRAM PRODUCT AND SYSTEM FOR REQUESTING ACKNOWLEDGMENT OF TRANSMITTED DATA PACKETS

FIELD

Embodiments of the invention relate, generally, to data transmission and, in particular, to the initiation of requests for acknowledgment of successfully, or unsuccessfully, transmitted data packets.

BACKGROUND

Various transmitting schemes exist for the transmission of data over wired and/or wireless networks, wherein a transmitter may be informed as to the success of transmission and/or reception of one or more transmitted data packets. In one such scheme, a receiver may indicate to the transmitter which of a plurality of data packets the receiver correctly received. Alternatively, the receiver may indicate which data packets were incorrectly received. According to one transmitting scheme, the receiver may automatically provide the transmitter with acknowledgement of successful, or unsuccessful, transmission and/or reception. Alternatively, according to other schemes, the transmitter may be required to request an acknowledgement, for example, by flagging one of the transmitted data packets with a polling bit. Regardless of the manner in which the receiver informs the transmitter of successful, or unsuccessful, transmission and/or reception of data packets, in many instances, the transmitter may store each of the transmitted data packets until such an acknowledgment has been received, so that the transmitter is able to retransmit any unsuccessfully transmitted or received data packets.

The transmitter implementing these schemes may be embodied in any electronic device (e.g., cellular telephone, personal digital assistant (PDA), personal computer (PC), laptop, pager, etc.) capable of transmitting data over a network, such as a wireless or wired personal area network (PAN), local area network (LAN), and/or wide area network (WAN). Alternatively, the transmitter may be embodied in a base station or similar network entity in communication with various electronic devices for the purpose of broadcasting data and/or communicating data between electronic devices.

One example of the type of transmitting scheme discussed above is the standardized radio access procedures for the $3^{rd}$ Generation Partnership Project (3GPP) Long-Term Evolution (LTE) Radio Link Control (RLC)/Media Access Control (MAC) protocol layer operation on an base station, referred to as an eNB, or an E-UTRAN (Evolved-UMTS Terrestrial Radio Access Network) Node B. In LTE, the RLC/MAC layers are responsible for preparing higher layer data for transmission by the physical (PHY) layer. Reliability may be achieved by using both the Hybrid Automated Repeat reQuest (HARQ) and the standard Automated Repeat re-Quest (ARQ) concepts. According to the 3GPP standard, LTE ARQ is implemented by transmitting user payload data in Protocol Data Units (PDUs) identified by a sequence number. Based on this number, the receiver is able to detect erroneous reception of data. In instances where the transmitter wants to be informed about successfully transmitted data, the transmitters may flag a transmitted PDU with a polling bit in order to request a confirmation about correctly received data from the receiver. In particular, a MAC layer of the LTE base station, or eNB, may, in response to receiving an instruction from the higher protocol layers, poll the receiver for information regarding successfully, or unsuccessfully received PDUs, by including a polling bit in a subsequently transmitted PDU.

As noted above, according to many of these transmitting schemes, the transmitter may store all relevant data, as well as any supplemental information associated with the data including, for example, segmentation information, for every data packet that has been created and transmitted but not acknowledged. In many instances it may be desirable to keep the number of acknowledgement requests and/or acknowledgements transmitted low, resulting in a rather large amount of data and supplemental information being stored and, therefore, rather remarkable memory requirements. This may be particularly true where the transmitter is embodied in a base station or similar entity that is responsible for transmitting data packets to numerous electronic devices and, therefore, for storing data packets associated with multiple data streams.

A need, therefore, exists for a way to enable a transmitter to retransmit data packets after being informed of all successfully, or unsuccessfully, transmitted and received data packets, while still maintaining optimal resource usage and allocation.

BRIEF SUMMARY

In general, embodiments of the present invention provide an improvement by, among other things, providing for the initiation of a request for acknowledgement of successful, or unsuccessful, transmission of data packets in response to the detection of a potential overload situation or an upcoming resource limitation. In particular, according to one embodiment of the present invention, a transmitter may monitor certain resources associated with the transmitter, such as memory consumption or processing capacity, and automatically request that a receiver transmit an acknowledgement when a potential overload of one or more of the resources is detected. This may occur, for example, when it is determined that memory consumption of the transmitter has exceeded a predefined threshold or that the processing capacity of the transmitter has been substantially exhausted, to name a few.

In one embodiment, the MAC layer of an LTE base station, or E-UTRAN Node B (eNB), may be responsible for monitoring resources associated not only with the individual MAC entity of the base station, but with the overall system as a whole (e.g., the resources of the overall eNB), and determining, on its own, when to poll the receiver for information regarding successfully, or unsuccessfully, received data packets. This is in contrast, or in addition, to the technique discussed above wherein the MAC layer polled the receiver upon receiving instructions to do so from the higher protocol layers.

In accordance with one aspect, an apparatus is provided for triggering a request for acknowledgement of previously transmitted data packets in response to a detected potential resource limitation. In one embodiment, the apparatus may include a processor configured to: (1) detect a potential overload of one or more resources associated with the apparatus; and (2) automatically request acknowledgement of one or more data packets previously transmitted on a data communication path, wherein the acknowledgment is requested in response to detecting the potential overload.

In one embodiment, in order to detect a potential overload of one or more resources, the processor may be further configured to monitor internal memory consumption of the apparatus and determine when the memory consumption has reached a predefined threshold. Alternatively, or in addition, in another embodiment, in order to detect a potential overload, the processor may further be configured to monitor a processing capacity associated with the apparatus and to determined when the processing capacity used has reached a predefined threshold.

According to another aspect, a method is provided of triggering a request for acknowledgement of previously transmitted data packets in response to a detected potential resource limitation. In one embodiment, the method may include: (1) detecting a potential overload of one or more resources; and (2) automatically requesting acknowledgement of one or more data packets previously transmitted on a data communication path, wherein the acknowledgment is requested in response to detecting the potential overload.

In accordance with yet another aspect, a computer program product is provided for triggering a request for acknowledgement of previously transmitted data packets in response to a detected potential resource limitation. The computer program product contains at least one computer-readable storage medium having computer-readable program code portions stored therein. The computer-readable program code portions of one exemplary embodiment include: (1) a first executable portion for detecting a potential overload of one or more resources; and (2) a second executable portion for automatically requesting acknowledgement of one or more data packets previously transmitted on a data communication path, wherein the acknowledgment is requested in response to detecting the potential overload.

According to one aspect, an apparatus is provided for triggering a request for acknowledgement of previously transmitted data packets in response to a detected potential resource limitation. In one embodiment, the apparatus may include: (1) means for detecting a potential overload of one or more resources associated with the apparatus; and (2) means for automatically requesting acknowledgement of one or more data packets previously transmitted on a data communication path, wherein the acknowledgment is requested in response to detecting the potential overload.

In accordance with another aspect, a system is provided for triggering a request for acknowledgement of previously transmitted data packets in response to a detected potential resource limitation. In one exemplary embodiment, the system may include an electronic device and a network entity configured to transmit one or more data packets to the electronic device. The network entity may further be configured to detect a potential overload of one or more resources associated with the network entity and to automatically request, in response to detecting the potential overload, acknowledgement from the electronic device of one or more data packets previously transmitted to the electronic device.

BRIEF DESCRIPTION OF THE SEVERAL VIEWS OF THE DRAWING(S)

Having thus described exemplary embodiments of the invention in general terms, reference will now be made to the accompanying drawings, which are not necessarily drawn to scale, and wherein:

DETAILED DESCRIPTION

Exemplary embodiments of the present invention now will be described more fully hereinafter with reference to the accompanying drawings, in which some, but not all embodiments of the inventions are shown. Indeed, exemplary embodiments of the invention may be embodied in many different forms and should not be construed as limited to the embodiments set forth herein; rather, these embodiments are provided so that this disclosure will satisfy applicable legal requirements. Like numbers refer to like elements throughout.

Overview:

In general, embodiments of the present invention provide an apparatus, method, computer program product and system for initiating a request for acknowledgment of successful, or unsuccessful, transmission of data packets in response to the detection of a potential resource limitation or overload associated with the transmitter. In particular, according to one embodiment, a transmitter may monitor certain internal resources, such as the amount of memory consumed by data associated with previously transmitted data packets awaiting potential retransmission, the remaining processing capacity associated with the transmitter, or the like. When a potential limitation or overload of one of the monitored resources is detected, for example when the amount of memory consumed exceeds a predetermined threshold or the processing capacity is substantially exhausted, the transmitter may automatically request acknowledgement of previously transmitted data packets. Upon receiving the requested acknowledgment, the transmitter may then be able to release from memory the data associated with previously transmitted data packets that were successfully transmitted and received.

According to one embodiment of the present invention, it is the Media Access Control (MAC) layer of a Long Term Evolution (LTE) base station, referred to as an E-UTRAN Node B (eNB), that may monitor the internal resources of the transmitter. This may include monitoring the resources of the MAC entity itself, as well as those of the overall system as a whole. Upon detecting a potential resource limitation, the MAC layer may, on its own (i.e., without receiving instructions from the higher protocol layers) decide to poll the receiver for information regarding successful, or unsuccessful, reception of previously transmitted packet data units (PDUs). The MAC layer may do so, for example, by setting a polling bit in a subsequently transmitted PDU. As one of ordinary skill in the art will recognize, while described in relation to the MAC layer, the foregoing may similarly be performed by other transmission protocols, such as Transmission Control Protocol (TCP), Stream Control Transmission Protocol (SCTP), or the like.

Based on the foregoing, by implementing embodiments of the present invention, the transmitter may more frequently request and receive acknowledgments regarding previously transmitted data packets, thus resulting in earlier releases of internally allocated memory within the transmitter. Embodiments, therefore, may provide for, among other things, optimization of the transmitter's internal resource consumption, which may result, for example, in the instance where the transmitter is embodied in a base station or similar network entity, in more data payload for more user radio bearers being supported by the transmitter without exceeding its resource limitations. Embodiments of the present invention may further enable the transmitter to handle overload situations locally before they emerge into real failures, which could lead to partial service breaks.

Figure 1:
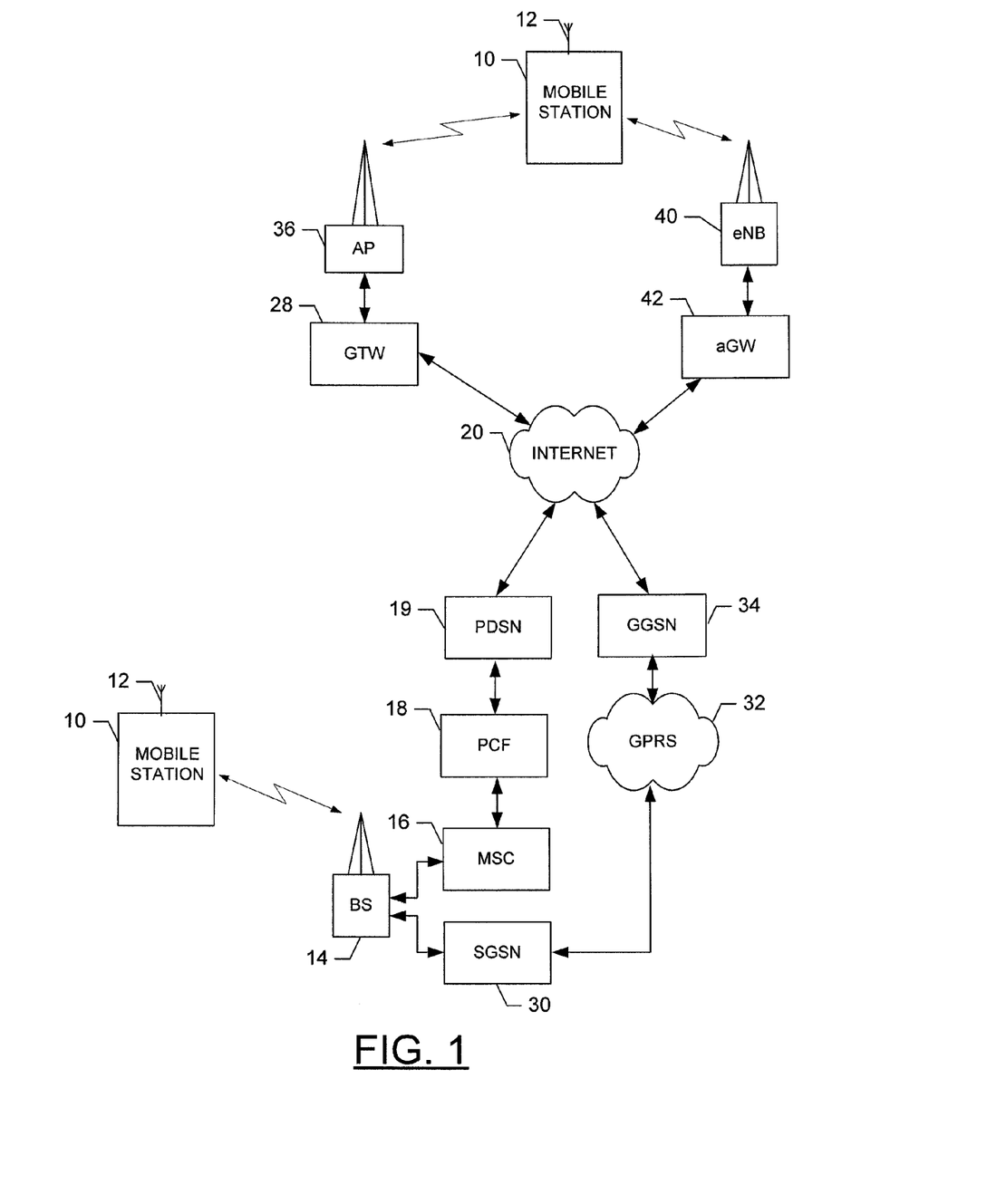
FIG. 1 is a block diagram of one type of system that would benefit from embodiments of the present invention.

Overall System and Electronic Device:

Referring to FIG. 1, an illustration of one type of system that would benefit from exemplary embodiments of the present invention is provided. As shown in FIG. 1, the system can include one or more mobile stations 10, each having an antenna 12 for transmitting signals to and for receiving signals from one or more base stations (BS's) 14. The base station is a part of one or more cellular or mobile networks that each includes elements required to operate the network, such as one or more mobile switching centers (MSC) 16. As well known to those skilled in the art, the mobile network may also be referred to as a Base Station/MSC/Interworking function (BMI). In operation, the MSC is capable of routing calls, data or the like to and from mobile stations when those mobile stations are making and receiving calls, data or the like. The MSC can also provide a connection to landline trunks when mobile stations are involved in a call.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a Packet Control Function (PCF) 18, and the PCF is coupled to a Packet Data Serving Node (PDSN) 19, which is in turn coupled to a WAN, such as the Internet 20. In turn, devices such as processing elements (e.g., personal computers, server computers or the like), not shown, can be coupled to the mobile station 10 via the Internet. As will be appreciated, the processing elements can comprise any of a number of processing devices, systems or the like capable of operating in accordance with embodiments of the present invention.

The BS 14 can also be coupled to a signaling GPRS (General Packet Radio Service) support node (SGSN) 30. As known to those skilled in the art, the SGSN is typically capable of performing functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 32. The packet-switched core network is then coupled to another GTW, such as a GTW GPRS support node (GGSN) 34, and the GGSN is coupled to the Internet.

In one embodiment, the mobile station 10 may further be connected to the base station of a 3GPP LTE network, referred to as an E-UTRAN (Evolved-UMTS Terrestrial Radio Access Network) Node B (eNB) 40. As one of ordinary skill in the art will recognize, the eNB may provide functionality similar to that provided by the BS 14 associated with other radio access networks (e.g., radio resource management control functions, such as radio bearer control and radio access control, as well as connection mobility control, dynamic resource allocation, etc.). The eNB may further be indirectly coupled to the Internet 20 via an LTE access gateway (aGW) 42, which, as one of ordinary skill in the art will recognize, likewise provides functionality similar to that of the gateways discussed above (e.g., paging origination, LTE_IDLE mode management, ciphering of the user plane, header compression (ROHC), etc.).

Although not every element of every possible network is shown and described herein, it should be appreciated that the mobile station 10 may be coupled to one or more of any of a number of different networks. In this regard, mobile network(s) can be capable of supporting communication in accordance with any one or more of a number of first-generation (1G), second-generation (2G), 2.5G and/or third-generation (3G) mobile communication protocols or the like. More particularly, one or more mobile stations may be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrowband AMPS (NAMPS), as well as TACS, network(s) may also benefit from embodiments of the present invention, as should dual or higher mode mobile stations (e.g., digital/analog or TDMA/CDMA/analog phones).

One or more mobile stations 10 (as well as one or more processing elements, although not shown as such in FIG. 1) can further be coupled to one or more wireless access points (APs) 36. The AP's can be configured to communicate with the mobile station in accordance with techniques such as, for example, radio frequency (RF), Bluetooth (BT), infrared (IrDA) or any of a number of different wireless networking techniques, including Wireless LAN (WLAN) techniques. The APs may be coupled to the Internet 20. Like with the MSC 16, the AP's can be directly coupled to the Internet. In one embodiment, however, the APs are indirectly coupled to the Internet via a GTW 28. As will be appreciated, by directly or indirectly connecting the mobile stations and the processing elements and/or any of a number of other devices to the Internet, whether via the AP's or the mobile network(s), the mobile stations and processing elements can communicate with one another to thereby carry out various functions of the respective entities, such as to transmit and/or receive data, content or the like. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 1, in addition to or in lieu of coupling the mobile stations 10 to one or more processing elements across the Internet 20, one or more such entities may be directly coupled to one another. As such, one or more network entities may communicate with one another in accordance with, for example, RF, BT, IrDA or any of a number of different wireline or wireless communication techniques, including LAN and/or Wireless LAN techniques. Further, the mobile station 10 and the processing elements can be coupled to one or more electronic devices, such as printers, digital projectors and/or other multimedia capturing, producing and/or storing devices (e.g., other terminals).

Figure 2:
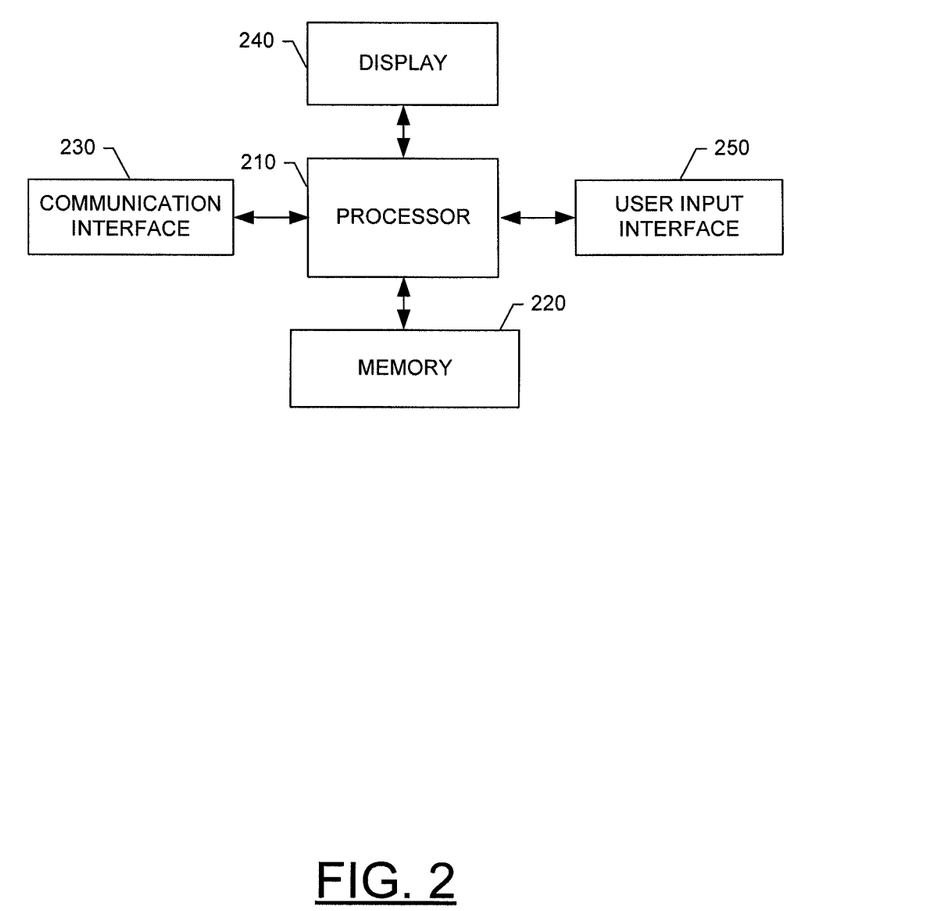
FIG. 2 is a schematic block diagram of an entity capable of operating as a base station, or similar network entity, in accordance with embodiments of the present invention.

Referring now to FIG. 2, a block diagram of an entity capable of operating as a base station 14, or similar network entity responsible for transmitting data packets to a plurality of electronic devices, is shown in accordance with one embodiment of the present invention. The entity capable of operating as a base station 14, or similar network entity, includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. As shown, the entity capable of operating as a base station 14, or similar network entity, can generally include means, such as a processor 210 for performing or controlling the various functions of the entity. In one embodiment, the processor may be in communication with or include memory 220, such as volatile and/or non-volatile memory that stores content, data or the like. In particular, in one embodiment, the processor may be configured to transmit one or more data packets and to store data associated with the transmitted data packets in the memory 220. The processor, or similar means, may thereafter be configured to detect a potential overload of one or more resources associated with the base station, or similar network entity, (e.g., the memory 220) and to automatically request acknowledgment of the one or more previously transmitted data packets in response to detecting the potential overload. For example, the processor, or similar means, may be configured to monitor the internal memory consumption and/or the processing capacity of the base station, or similar entity, and to determine when either the memory consumption has reached a predefined threshold or the processing capacity is substantially exhausted or has similarly reached a predefined threshold, or both. Once an acknowledgment that at least one of the previously transmitted data packets has been successfully transmitted has been received, the processor may be further configured to then release any data associated with that data packet from the memory 220.

The memory 220 typically stores content transmitted from, and/or received by, the entity. Also for example, the memory 220 typically stores software applications, instructions or the like for the processor to perform steps associated with operation of the entity in accordance with embodiments of the present invention. For example, in one embodiment, the memory 220 may store the resource control entity discussed below with regard to FIG. 4.

In addition to the memory 220, the processor 210 can also be connected to at least one interface or other means for displaying, transmitting and/or receiving data, content or the like. In this regard, the interface(s) can include at least one communication interface 230 or other means for transmitting and/or receiving data, content or the like, as well as at least one user interface that can include a display 240 and/or a user input interface 250, though these types of user interfaces may be more applicable to other entities, such as cellular telephones, PDAs, and the like, than to base stations or similar network entities responsible for transmitting data packets to the cellular telephones or other electronic devices. The user input interface, in turn, can comprise any of a number of devices allowing the entity to receive data from a user, such as a keypad, a touch display, a joystick or other input device.

Figure 3:
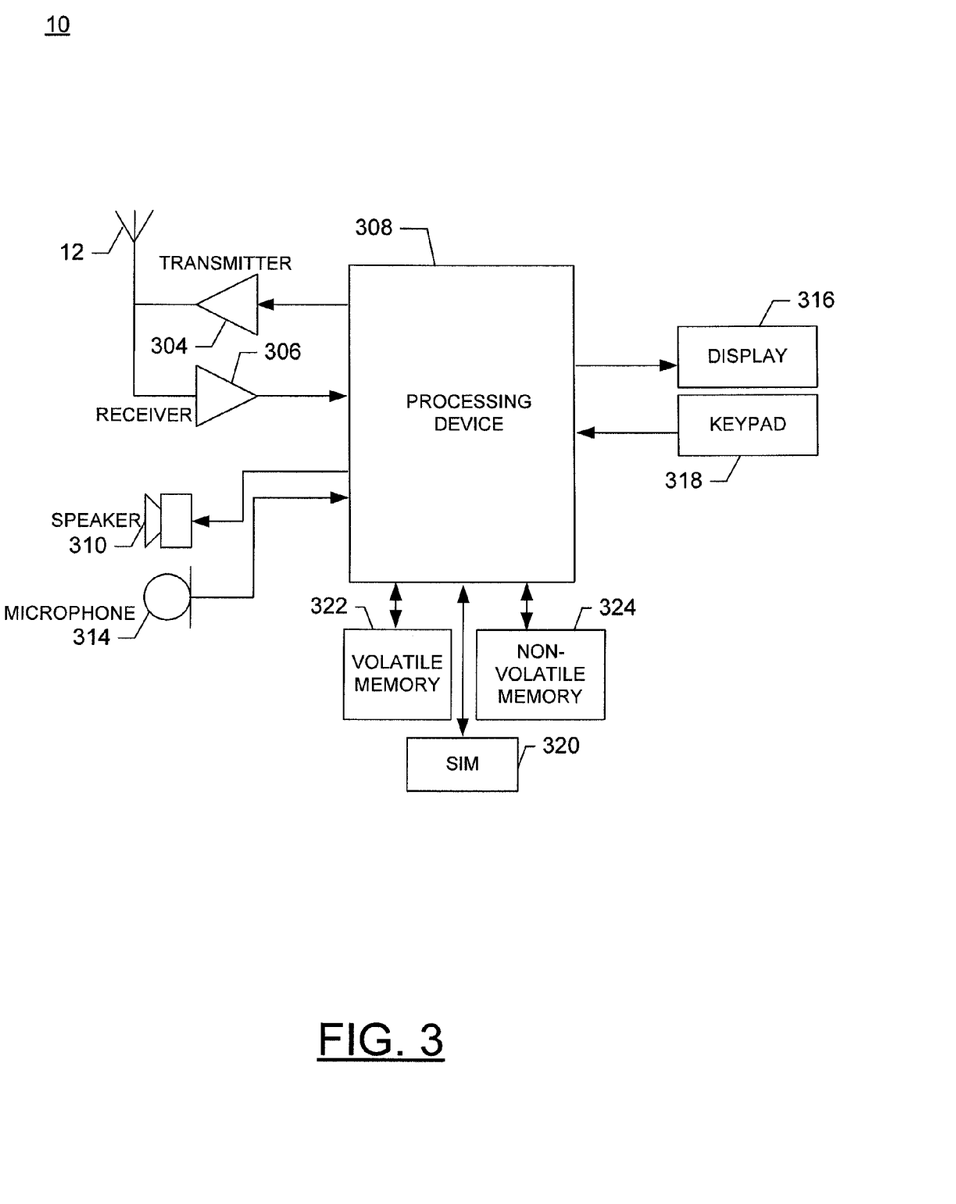
FIG. 3 is a schematic block diagram of a mobile station capable of operating in accordance with an embodiment of the present invention.

Reference is now made to FIG. 3, which illustrates one type of electronic device that would benefit from embodiments of the present invention. As shown, the electronic device may be a mobile station 10, and, in particular, a cellular telephone. It should be understood, however, that the mobile station illustrated and hereinafter described is merely illustrative of one type of electronic device that would benefit from the present invention and, therefore, should not be taken to limit the scope of the present invention. While several embodiments of the mobile station 10 are illustrated and will be hereinafter described for purposes of example, other types of mobile stations, such as personal digital assistants (PDAs), pagers, laptop computers, as well as other types of electronic systems including both mobile, wireless devices and fixed, wireline devices, can readily employ embodiments of the present invention.

The mobile station includes various means for performing one or more functions in accordance with exemplary embodiments of the present invention, including those more particularly shown and described herein. It should be understood, however, that the mobile station may include alternative means for performing one or more like functions, without departing from the spirit and scope of the present invention. More particularly, for example, as shown in FIG. 3, in addition to an antenna 302, the mobile station 10 includes a transmitter 304, a receiver 306, and an apparatus that includes means, such as a processing device 308, e.g., a processor, controller or the like, that provides signals to and receives signals from the transmitter 304 and receiver 306, respectively, and that performs the various other functions described below including, for example, the functions relating to initiating a request for acknowledgment of one or more previously transmitted data packets in response to a detected potential overload of one or more resources associated with the mobile station 10.

As discussed in more detail below with regard to FIG. 4, in one embodiment, the processor 308 may be configured to detect a potential overload of one or more resources associated with the mobile station 10, for example by monitoring the internal memory consumption of the mobile station (e.g., memory consumed by the storage of data associated with previously transmitted data packets) and determining when the memory consumption has reached a predefined threshold. The processor 308 may further be configured to then automatically request acknowledgement of one or more previously transmitted data packets in response to the detected potential overload.

As one of ordinary skill in the art would recognize, the signals provided to and received from the transmitter 304 and receiver 306, respectively, may include signaling information in accordance with the air interface standard of the applicable cellular system and also user speech and/or user generated data. In this regard, the mobile station can be capable of operating with one or more air interface standards, communication protocols, modulation types, and access types. More particularly, the mobile station can be capable of operating in accordance with any of a number of second-generation (2G), 2.5G and/or third-generation (3G) communication protocols or the like. Further, for example, the mobile station can be capable of operating in accordance with any of a number of different wireless networking techniques, including Bluetooth, IEEE 802.11 WLAN (or Wi-Fi®), IEEE 802.16 WiMAX, ultra wideband (UWB), and the like.

It is understood that the processing device 308, such as a processor, controller or other computing device, may include the circuitry required for implementing the video, audio, and logic functions of the mobile station and may be capable of executing application programs for implementing the functionality discussed herein. For example, the processing device may be comprised of various means including a digital signal processor device, a microprocessor device, and various analog to digital converters, digital to analog converters, and other support circuits. The control and signal processing functions of the mobile device are allocated between these devices according to their respective capabilities. The processing device 308 thus also includes the functionality to convolutionally encode and interleave message and data prior to modulation and transmission. The processing device can additionally include an internal voice coder (VC) 308A, and may include an internal data modem (DM) 308B. Further, the processing device 308 may include the functionality to operate one or more software applications, which may be stored in memory. For example, the controller may be capable of operating a connectivity program, such as a conventional Web browser. The connectivity program may then allow the mobile station to transmit and receive Web content, such as according to HTTP and/or the Wireless Application Protocol (WAP), for example.

The mobile station may also comprise means such as a user interface including, for example, a conventional earphone or speaker 310, a ringer 312, a microphone 314, a display 316, all of which are coupled to the controller 308. The user input interface, which allows the mobile device to receive data, can comprise any of a number of devices allowing the mobile device to receive data, such as a keypad 318, a touch display (not shown), a microphone 314, or other input device. In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile station can also include means, such as memory including, for example, a subscriber identity module (SIM) 320, a removable user identity module (R-UIM) (not shown), or the like, which typically stores information elements related to a mobile subscriber. In addition to the SIM, the mobile device can include other memory. In this regard, the mobile station can include volatile memory 322, as well as other non-volatile memory 324, which can be embedded and/or may be removable. For example, the other non-volatile memory may be embedded or removable multimedia memory cards (MMCs), secure digital (SD) memory cards, Memory Sticks, EEPROM, flash memory, hard disk, or the like. The memory can store any of a number of pieces or amount of information and data used by the mobile device to implement the functions of the mobile station. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content. The memory may, for example, store computer program code for an application and other computer programs. For example, in one embodiment of the present invention, the memory may store computer program code for detecting a potential overload of one or more resources associated with the mobile station 10, for example by monitoring the processing capacity of the mobile station 10 and determining when the processing capacity has been substantially exhausted. The memory may further store computer program code for then automatically requesting acknowledgement of one or more previously transmitted data packets, for example by flagging a subsequently transmitted data packet with a polling bit, in response to the detected potential overload.

The apparatus, method, computer program product and system of exemplary embodiments of the present invention are primarily described in conjunction with mobile communications applications. It should be understood, however, that the apparatus, method, computer program product and system of embodiments of the present invention can be utilized in conjunction with a variety of other applications, both in the mobile communications industries and outside of the mobile communications industries. For example, the apparatus, method, computer program product and system of exemplary embodiments of the present invention can be utilized in conjunction with wireline and/or wireless network (e.g., Internet) applications.

Method of Initiating Request of Acknowledgment

Figure 4:
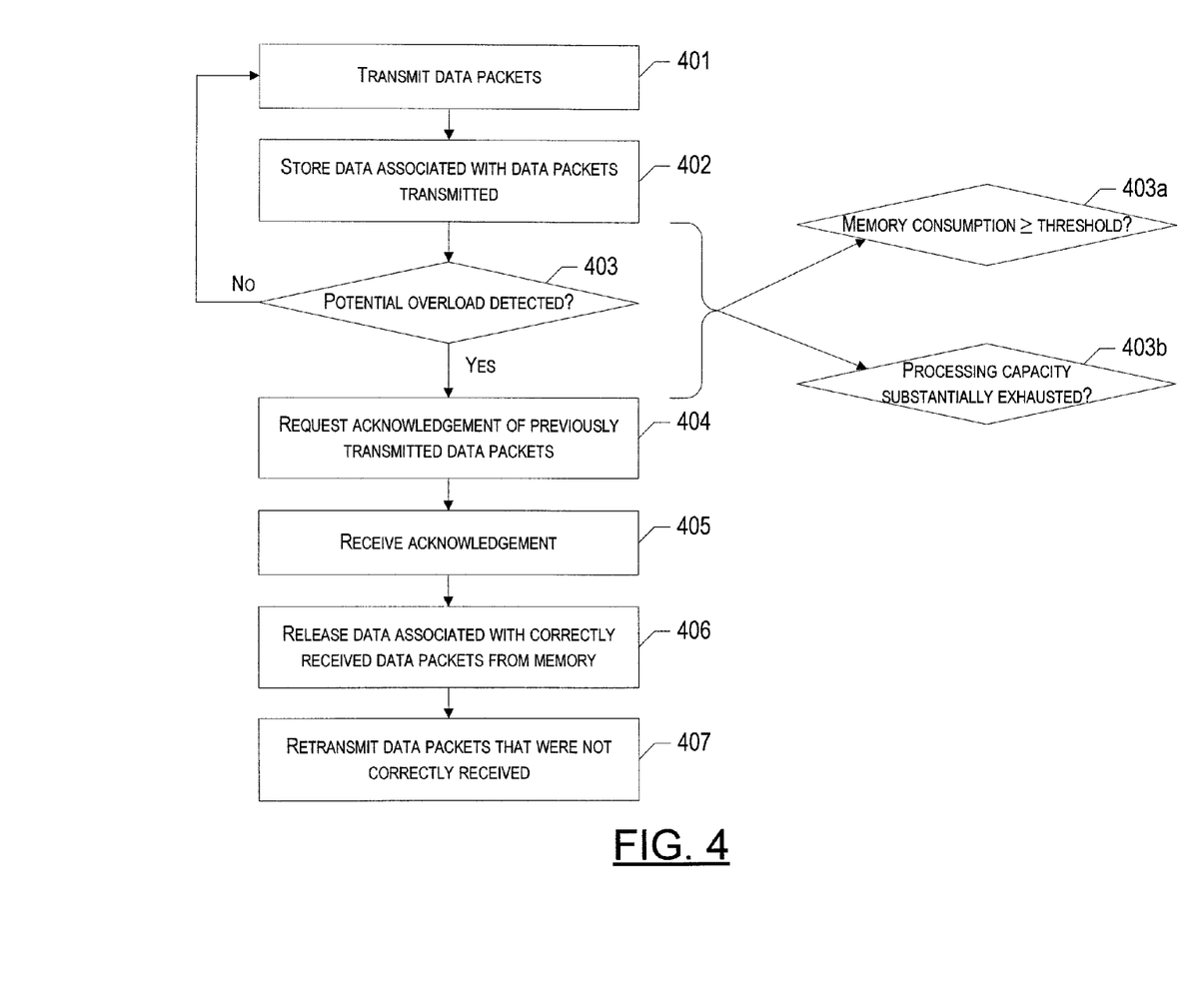
FIG. 4 is a flow chart illustrating the process of initiating a request for acknowledgment of correctly, or incorrectly, received data packets in accordance with embodiments of the present invention.

Referring now to FIG. 4, the operations are illustrated that may be taken in order to initiate a request for acknowledgment of previously transmitted data packets in response to internally detecting a potential overload of one or more resources of the transmitter. As shown, the process may begin when the transmitter, and in particular means, such as a processor associated with the transmitter, transmits one or more data packets. As noted above, the transmitter may be embodied in any electronic device (e.g., cellular telephone, personal digital assistant (PDA), personal computer (PC), laptop, pager, etc.) capable of transmitting data packets over a wired or wireless communication network (e.g., wired or wireless PAN, LAN, WAN, etc.) according to any known, or not yet known, communication protocol (e.g., Bluetooth, GPRS, EDGE, UMTS, CDMA2000, etc.). Alternatively, the transmitter may be embodied in a network entity (e.g., base station) operating within the communication network for the purpose of broadcasting data packets to and/or communicating data packets between various electronic devices, also in accordance with any known, or not yet known, communication protocol.

According to one embodiment, a sequence number may be associated with each transmitted data packet. As discussed in more detail below, this sequence number may later be used for indicating which of the transmitted data packets were successfully, or unsuccessfully, transmitted, as well as indicating for which group of transmitted data packets the transmitter would like to receive such an indication.

Upon transmitting each of the data packets, the transmitter and, in particular means, such as a processor operating in association with the transmitter, may store data associated with each data packet transmitted. (Block 402). In particular, the transmitter may store the data packet itself, as well as supplemental information associated with the data packet. This supplemental information may include, for example, information associated with how various data packets are segmented and/or should be combined or how to reconstruct a data packet from internal memory in case of requested retransmission (e.g., a pointer to memory, the length of the data packets, etc.), the number of segments in the original data packet, the amount of retransmission already performed on the data packet, polling details of the original data packet, and/or a sequence number associated with the data packet. As noted above, the transmitter may store the data associated with previously transmitted data packets so that incorrectly received data packets can later be retransmitted to the receiver.

As discussed above, it may often be desirable for a transmitter to be informed as to the data packets that it has successfully transmitted and that have been correctly received by the receiver. Using this information, the transmitter may be able to retransmit any data packets that the receiver did not correctly receive. In many instances, in order to receive an acknowledgment of the successfully, or unsuccessfully, transmitted data packets, the transmitter may periodically request such information by, for example, flagging a polling bit of a subsequently transmitted data packet. According to embodiments of the present invention, the transmitter may determine when to request the acknowledgment information based on the detection, at Block 403, of a potential overload of one or more of the resources associated with the transmitter. For example, according to one embodiment (shown as Block 403*a*), the transmitter, and in particular means, such as a processor associated with the transmitter, may monitor the internal memory consumption of the transmitter and then determine that a potential overload exists when the memory consumed, for example by the stored data associated with previously transmitted data packets, has reached or exceeds some predefined threshold. Alternatively, in another embodiment (shown as Block 403*b*), the transmitter, and in particular means, such as a processor associated with the transmitter, may monitor the processing capacity associated with the transmitter, wherein a potential overload of one or more of the resources associated with the transmitter may be detected when the processing capacity of the transmitter is substantially exhausted. In particular, the utilization ratio or controller load of the processor or controller may be monitored. In one embodiment, the processing capacity may be considered substantially exhausted when the capacity used (e.g., as determined based on the utilization ratio or controller load) has reached some predefined threshold, such as when, for example, 90 or 95% of the available processing capacity has been used. In yet another embodiment, a pro-active technique may be used for detecting a potential overload, wherein the total amount of packets currently "on-air," or transmitted yet not acknowledged or discarded is monitored. When this amount exceeds some predefined threshold, a potential overload situation may be detected. Using this technique, a potential overload situation could be detected prior to it actually occurring.

In yet another embodiment, not shown, the transmitter, and in particular a processor associated with the transmitter, may look to the current processing load associated with the transmitter, as well as how that load has changed over a certain period of time, and predict a potential overload of one or more resources based on that change. In other words, the processor may determine that, were the processing load to continue to change (e.g., increase) in the same manner and at the same rate as observed, an overload of the resources may be likely to occur in the near future.

In one embodiment, the process of internally monitoring resources associated with the transmitter and detecting when a potential overload of one or more of those resources exists may be performed at the Media Access Control (MAC) layer of the radio interface protocol stack. As one of ordinary skill in the art will recognize, according to various communication protocols, the MAC layer, in combination with the Radio Link Control (RLC) layer, is responsible for preparing data received from higher layer protocols (e.g., Radio Resource Control (RRC) and/or service-specific protocol layers, such as Packet Data Convergence Protocol (PDCP) or Broadcast/Multicast Control Protocol (BMC)) for transmission over the physical layer (PHY). In many instances these higher layer protocols, and in particular the RRC protocol layer, may specifically instruct the MAC layer to transmit a request for acknowledgment of previously transmitted data packets. Alternatively, or in addition, the RRC protocol layer may specify certain triggers which should automatically result in the transmission of the request for acknowledgement. For example, the RRC protocol may specify that the request (e.g., in the form of a polling bit of a subsequently transmitted data packet) should be transmitted when the transmission window is filled to a certain percentage or degree with unacknowledged Protocol Data Units (PDUs) and/or when the last Service Data Unit (SDU) in the buffer was transmitted.

According to one embodiment of the present invention, in addition to or in lieu of receiving specific instructions from the RRC protocol layer to request acknowledgement of transmitted data packets and RRC-set triggers for transmitting the request, the MAC layer may perform its own internal monitoring and detecting of resource limitations and potential overloads and, in response to detecting and in order to avoid the detected potential overload, request acknowledgment of previously transmitted data packets, enabling the transmitter to free up previously consumed resources.

In one embodiment, where, for example, the transmitter is embodied in a network entity, such as a base station, responsible for broadcasting and/or transmitting multiple data streams to a plurality of electronic devices, the transmitter may include a resource control entity, for example, in the form of software executed by the processor associated with the transmitter. The resource control entity may receive information associated with resource usage and limitations of multiple MAC layers, providing the resource control entity with an overall picture of resource consumption. According to one embodiment, the resource control entity may use this information to detect potential overloads of the transmitter resources and then instruct respective MAC layers to request acknowledgment of previously transmitted data packets accordingly. Alternatively, in another embodiment, each MAC layer may monitor, detect and request acknowledgment based on its own resource limitations.

Returning to FIG. 4, once a potential overload of one or more resources associated with the transmitter has been detected, at Block 404, the transmitter, and in particular means, such as a processor associated with the transmitter, may transmit a request for acknowledgement of one or more previously transmitted data packets. As noted above, in one embodiment, the transmitter may do so by flagging a subsequently transmitted data packet with a polling bit, which indicates to the receiver that the transmitter would like to be informed of the success of transmission and receipt of some group of previously transmitted data packets. In one embodiment, the request may specifically indicate, for example using data packet sequence numbers, the group of data packets for which the transmitter requests acknowledgment. Alternatively, no indication may be provided, resulting in the receiver providing an acknowledgment of all data packets transmitted since the last acknowledgment was provided.

In response, at Block 405, the transmitter may receive an acknowledgment from the receiver. In one embodiment, the acknowledgment may indicate those data packets (e.g., by their sequence number) that were correctly received by the receiver. Alternatively, the acknowledgment may indicate, in some manner, those data packets that were incorrectly received. As one of ordinary skill in the art will recognize, any number of techniques may be used to inform the transmitter of the data packets that were not successfully transmitted and/or received without departing from the spirit and scope of the present invention.

The transmitter, and in particular means, such as a processor operating in association with the transmitter, may then, based on the acknowledgment received, release from memory the data associated with data packets that were successfully transmitted and received (Block 406) and retransmit those data packets that were not successfully transmitted and/or received (Block 407).

As noted above, by implementing embodiments of the present invention, the transmitter may more frequently request and receive acknowledgments regarding previously transmitted data packets, thus resulting in earlier releases of internally allocated memory within the transmitter. In turn, the earlier release of memory may result in a decrease in the amount of memory required per user where, for example, the transmitter is embodied in a network entity responsible for broadcasting and/or transmitting data packets in relation to multiple users and multiple data streams. Less memory per user may further result in more users being able to receive data at any given period of time. Embodiments of the present invention, therefore, may not only enable a transmitter to locally handle overload situations before they rise to the level of real failures, but may also increase capacity of the communication network overall.

Figure 5:
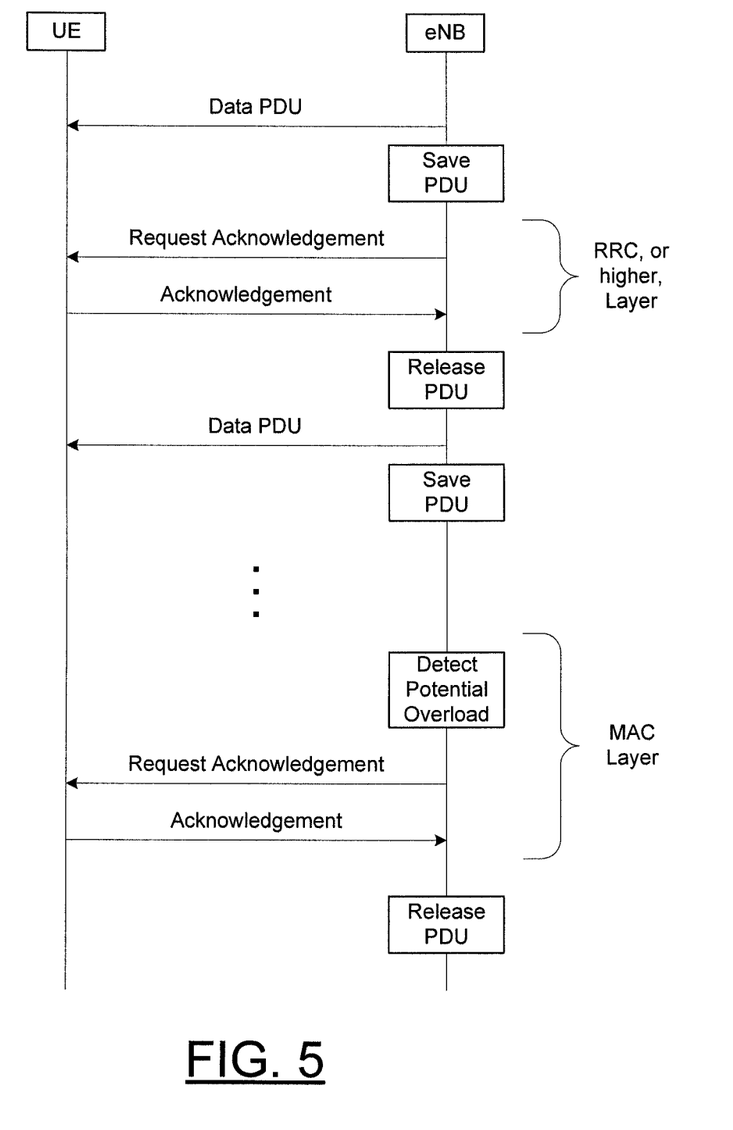
FIG. 5 illustrates the data transmission and buffering in accordance with one embodiment of the present invention.

Reference is now made to FIG. 5, which illustrates the data transmission and buffering described above in relation to the embodiment involving the E-UTRAN Node B (eNB) of an LTE network in communication with a mobile station, or user equipment (UE), over a data communication path for the purposes of transmitting protocol data units (PDUs). As shown, each time the eNB transmits a PDU to the UE, the eNB may save the PDU in a buffer for use in the event that the PDU needs to be retransmitted. At some point, the eNB may request acknowledgement of all previously transmitted PDUs by, for example, setting a polling bit of a subsequently transmitted PDU. In response to receiving the acknowledgment, the eNB may then release any successfully transmitted PDUs from the buffer.

As discussed above, according to known methods of polling, the Radio Resource Control (RRC), or higher, layer of the eNB may instruct the eNB's MAC layer to request acknowledgment of the previously transmitted PDUs based on certain predefined rules or triggers. As shown in FIG. 5, and as discussed above, according to embodiments of the present invention, the MAC layer, or other transmission protocol (e.g., TCP, SCTP, etc.), may also decide on its own to request acknowledgment of previously transmitted PDUs in response to detecting a potential overload of one or more resources associated with the MAC entity and/or the eNB as a whole.

Conclusion:

As described above and as will be appreciated by one skilled in the art, embodiments of the present invention may be configured as an apparatus, method or system. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as processor 210 discussed above with reference FIG. 2, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus (e.g., processor 210 of FIG. 2) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these exemplary embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
   at least one processor; and
   at least one memory including computer program code, the at least one memory and the computer program code configured to, with the at least one processor, cause the apparatus to perform at least the following:
   detect a potential overload of one or more Media Access Control layer resources associated with the apparatus;
   automatically cause request of acknowledgment of one or more data packets previously transmitted on a data communication path based on the detected potential overload;
   provide for transmission of one or more data packets on the data communication path;
   provide for storage of the previously transmitted data packets in memory;
   receive an acknowledgment of at least one of the one or more previously transmitted data packets in response to the request for acknowledgment; and
   release from memory the at least one acknowledged data packet,
   wherein the acknowledgment is requested in response to detecting the potential overload, the data communication path comprises a link between a mobile station and a base station, and both the detection of the potential overload and request for acknowledgment are performed independent of instructions or triggers provided by a Radio Resource Control protocol layer.

2. The apparatus of claim 1, wherein in order to detect a potential overload of one or more resources, the at least one memory and the computer program code are further configured to, with the at least one processor, cause the apparatus to:

monitor internal memory consumption of the apparatus; and determine when the memory consumption has reached a predefined threshold.

3. The apparatus of claim 1, wherein in order to detect a potential overload of one or more resources, the at least one memory and the computer program code are further configured to, with the at least one processor, cause the apparatus to:

monitor a processing capacity associated with the apparatus; and determine when the processing capacity used has reached a predefined threshold.

4. The apparatus of claim 1, wherein in order to automatically cause request of acknowledgment of one or more previously transmitted data packets, the at least one memory and the computer program code are further configured to, with the at least one processor, cause the apparatus to provide for transmission of an additional data packet flagged with a polling bit indicating the request for acknowledgment.

5. A method comprising:

detecting a potential overload of one or more Media Access Control layer resources;

automatically causing request of acknowledgment of one or more data packets previously transmitted on a data communication path based on the detected potential overload;

transmitting one or more data packets on the data communication path;

storing the previously transmitted data packets in memory;

receiving an acknowledgment of at least one of the one or more previously transmitted data packets in response to the request for acknowledgment; and releasing from memory the at least one acknowledged data packet, wherein the acknowledgment is requested in response to detecting the potential overload, the data communication path comprises a link between a mobile station and a base station, and both the detection of the potential overload and request for acknowledgment are performed independent of instructions or triggers provided by a Radio Resource Control protocol layer.

6. The method of claim 5, wherein detecting a potential overload of one or more resources further comprises:

monitoring at least one of an internal memory consumption or a processing capacity; and determining when at least one of the memory consumption or the processing capacity used has reached a predefined threshold.

7. The method of claim 5, wherein automatically causing request of acknowledgment of one or more previously transmitted data packets further comprises transmitting an additional data packet flagged with a polling bit indicating the request for acknowledgment.

8. A computer program product wherein the computer program product comprises at least one computer-readable storage medium having computer-readable program code portions stored therein, wherein the computer-readable program code portions comprise:

a first executable portion for detecting a potential overload of one or more Media Access Control layer resources;

a second executable portion for automatically causing request of acknowledgment of one or more data packets previously transmitted on a data communication path based on the detected potential overload;

a third executable portion for providing for transmission of one or more data packets on the data communication path;

a fourth executable portion for providing for storage of the previously transmitted data packets in memory;

a fifth executable portion for receiving an acknowledgment of at least one of the one or more previously transmitted data packets in response to the request for acknowledgment; and a sixth executable portion for releasing from memory the at least one acknowledged data packet, wherein the acknowledgment is requested in response to detecting the potential overload, the data communication path comprises a link between a mobile station and a base station, and both the detection of the potential overload and request for acknowledgment are performed independent of instructions or triggers provided by a Radio Resource Control protocol layer.

9. The computer program product of claim 8, wherein the first executable portion is configured to:

monitor internal memory consumption; and determine when the memory consumption has reached a predefined threshold.

10. The computer program product of claim 8, wherein the first executable portion is configured to:

monitor a processing capacity; and determine when the processing capacity used has reached a predefined threshold.

11. The computer program product of claim 8, wherein the second executable portion is configured to provide for transmission of an additional data packet flagged with a polling bit indicating the request for acknowledgment.

12. An apparatus comprising:

means for detecting a potential overload of one or more Media Access Control layer resources associated with the apparatus;

means for automatically causing request of acknowledgment of one or more data packets previously transmitted on a data communication path based on the detected potential overload;

means for transmitting one or more data packets on the data communication path;

means for storing the previously transmitted data packets in memory;

means for receiving an acknowledgment of at least one of the one or more previously transmitted data packets in response to the request for acknowledgment; and means for releasing from memory the at least one acknowledged data packet, wherein the acknowledgment is requested in response to detecting the potential overload, the data communication path comprises a link between a mobile station and a base station, and both the detection of the potential overload and request for acknowledgment are performed independent of instructions or triggers provided by a Radio Resource Control protocol layer.

13. The apparatus of claim 12, wherein the means for detecting a potential overload of one or more resources further comprises:

means for monitoring at least one of an internal memory consumption of the apparatus or a processing capacity associated with the apparatus; and means for determining when at least one of the memory consumption or the processing capacity used has reached a predefined threshold.

14. A system comprising:

a mobile device; and a base station configured to transmit one or more data packets to the mobile device, said base station configured to detect a potential overload of one or more Media Access Control layer resources associated with the base station, to automatically cause request of, based on the detected potential overload, acknowledgment from the mobile device of one or more data packets previously transmitted to the mobile device, to transmit one or more data packets on the data communication path, to store the previously transmitted data packets in memory, to receive an acknowledgment of at least one of the one or more previously transmitted data packets in response to the request for acknowledgment, and to release from memory the at least one acknowledged data packet, wherein both the detection of the potential overload and request for acknowledgment are performed independent of instructions or triggers provided by a Radio Resource Control protocol layer.

15. The system of claim 14, wherein in order to detect a potential overload of one or more resources, the base station is further configured to:

monitor internal memory consumption of the base station; and     determine when the memory consumption has reached a predefined threshold.

16. The system of claim 14, wherein in order to detect a potential overload of one or more resources, the base station is further configured to:

monitor a processing capacity associated with the base station; and     determine when the processing capacity used has reached a predefined threshold.

17. The apparatus of claim 1, wherein in order to detect potential overload of one or more resources, the at least one memory and the computer program code are further configured to, with the at least one processor, cause the apparatus to store supplemental information associated with the data packets.

* * * * *